Patented June 25, 1946

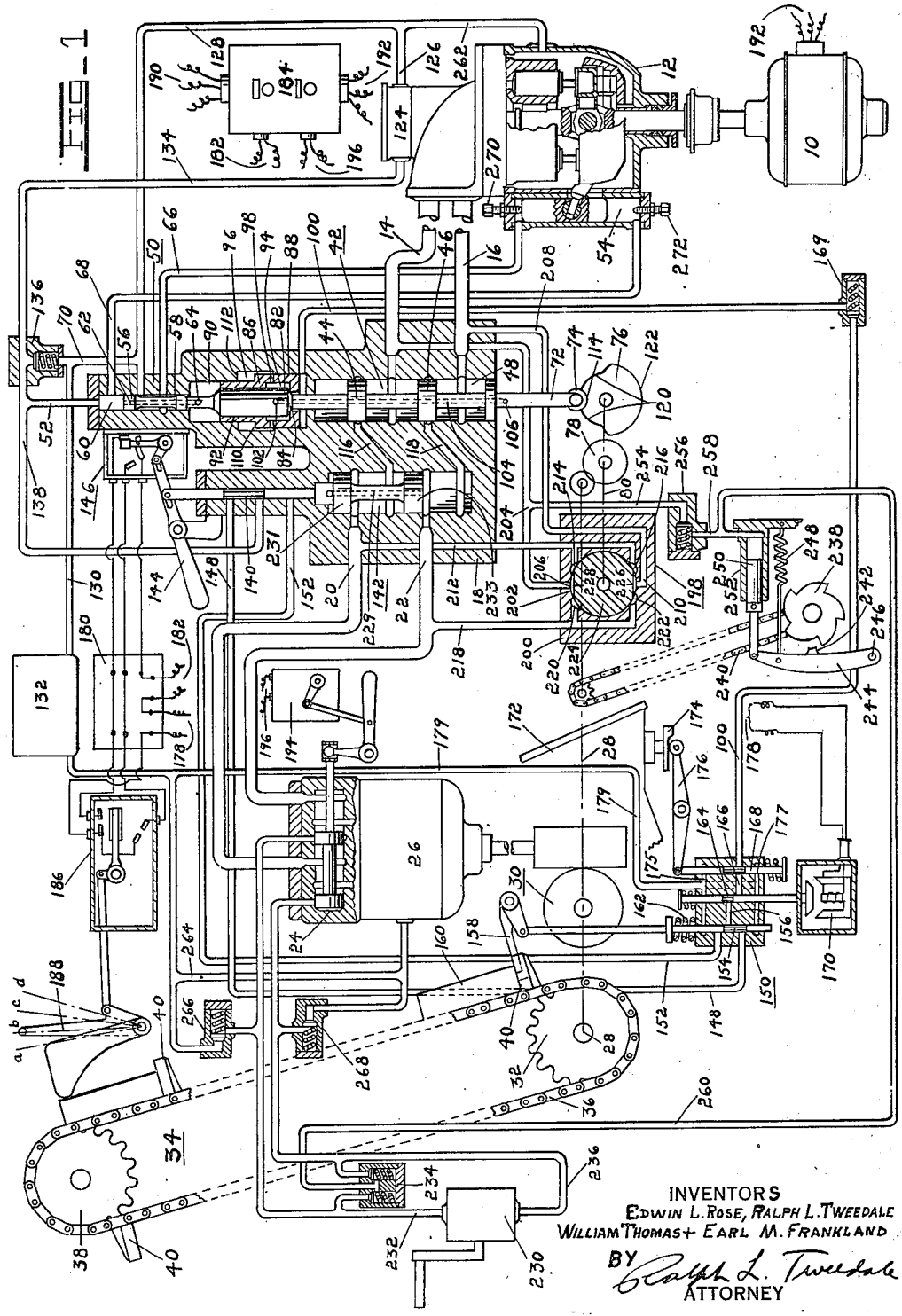

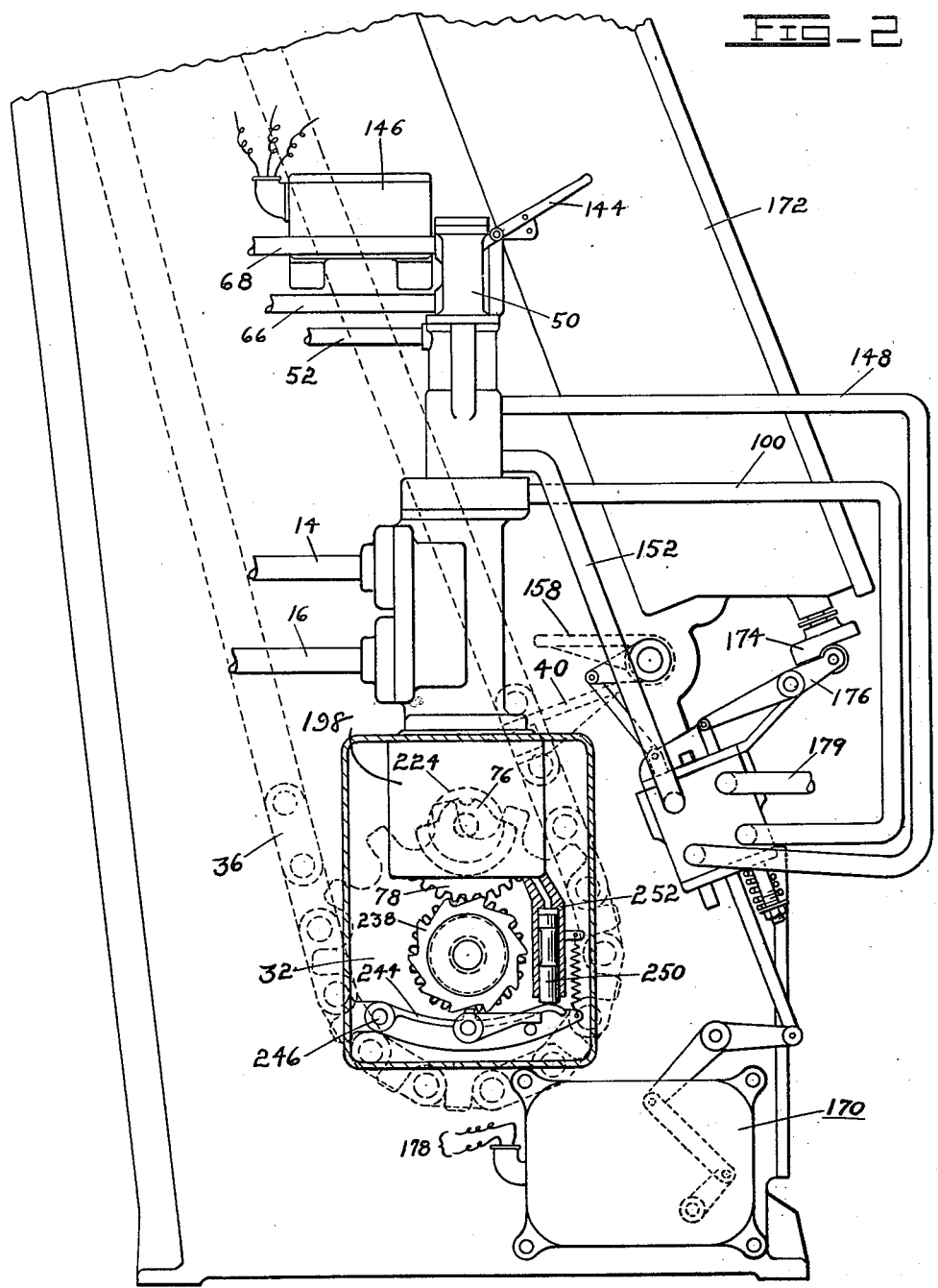

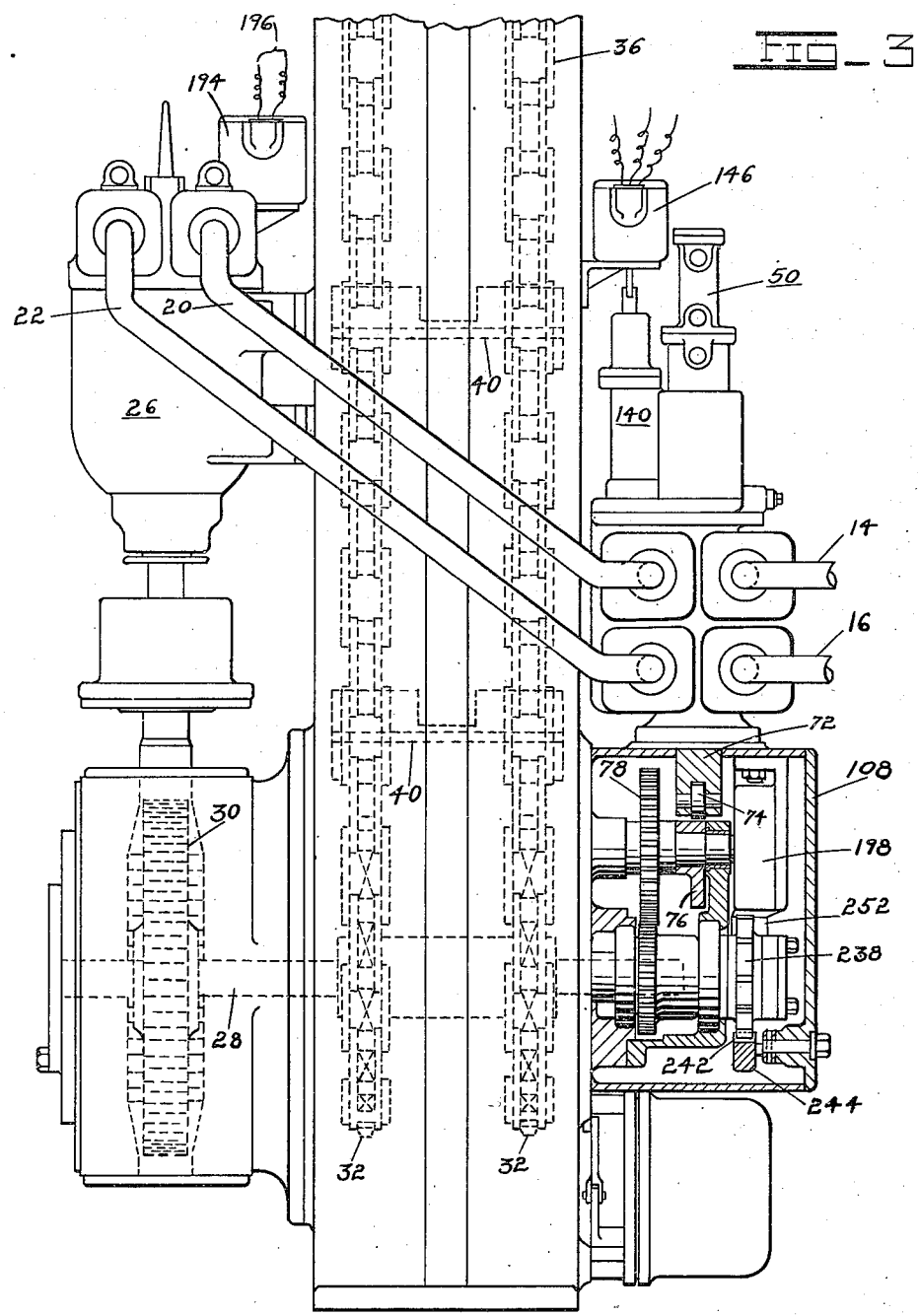

2,402,777

UNITED STATES PATENT OFFICE 2,402,777

POWER TRANSMISSION

Edwin L. Rose, Ralph L. Tweedale, William Thomas, and Earl M. Frankland, Waterbury, Conn., assignors to The Waterbury Tool Company, Waterbury, Conn., a corporation of Connecticut Application February 14, 1936, Serial No. 63,888
Renewed February 20, 1939

24 Claims. (Cl. 198—37)

This invention relates, generally, to power transmissions and the invention has reference, more particularly, to a novel fluid or hydraulic pressure operated and controlled drive system adapted to automatically drive a load device through a predetermined cycle of operation. Such a power transmission is adapted for use with many different load devices with which it is desirable to be able to control the acceleration and deceleration precisely for driving the device with varying velocity through a predetermined cycle of operation.

For example, the present invention is particularly suitable for hoists or conveyors for transporting articles from one point to another. If the articles to be transported are of a fragile or delicate nature, such that damage is likely to occur if they are subjected to jars and jolts, it becomes desirable to provide a conveyor drive which will insure not only that the conveyor itself does not cause any jarring of the articles loaded thereon but also that the conveyor may be loaded and unloaded by the attendants without requiring a high degree of dexterity to insure against damage occurring when placing articles thereon and removing them therefrom while maintaining a reasonably high speed of transportation on the conveyor.

These and other considerations make it desirable to provide a conveyor drive which may be controlled to operate, for example, a chain type conveyor, at varying speeds and with varying accelerations and decelerations under precise and positive control. Thus, for example, in some conveyor installations it is desirable to operate the conveyor intermittently with a period of rest for loading at one end and unloading at the other end, and then upon the completion of loading and unloading to move the conveyor through the distance required to bring an article into place at the unloading station and an empty flight into place at the loading station. It is desirable to control the conveyor drive as to make this movement start and stop with the maximum acceleration and deceleration, respectively, consistent with the previously mentioned limitations regarding jarring of the articles on the conveyor.

Heretofore, chain type conveyors or hoists have largely been driven by electric motors, either directly or through reduction gearing, and in order to obtain the wide variations in speed required to operate such hoists efficiently, it has been necessary, even when using a D. C. supply, to employ a complicated and easily deranged system of electric rheostats and control units. It is far preferable to use an A. C. supply with the result that it has been exceedingly difficult, if not impossible, to obtain the desired speed variation necessary for the efficient operation of electric motor driven chain type hoists owing to the inherent nature of A. C. motors to operate at constant or synchronous speed, and as a result, attempts have been made to operate some chain hoists continuously at constant speed, which is not only inefficient because of the necessarily low speed of operation, but is hard on the attendants since they must load and unload the articles while the conveyor or hoist is moving, and this must be done without undue jolting or jarring of the fragile articles.

The principal object of the present invention is to provide a novel hoist or chain conveyor drive that is operated and controlled by fluid or hydraulic pressure, thereby insuring smooth, quiet and vibrationless operation of the hoist or conveyor driven thereby, the said novel drive when applied to a hoist serving, upon the loading of an article on to the receiving end of the temporarily stationary hoist and the removal of an article from the delivery end thereof, provided an article has reached the hoist delivery end, firstly, to automatically start and accelerate the hoist or conveyor chain with a maximum feasible acceleration for a short period, secondly, to drive the hoist or conveyor at a substantially constant speed for a short interval, and thirdly, to decelerate the hoist with a maximum feasible deceleration to a stop, the hoist chain having moved a distance equal to the space between successive chain flights during such period of motion, whereupon the operation or cycle is again automatically repeated, and so on as long as desired, the hoist moving intermittently and the articles being loaded and removed during the periods when the hoist is stationary. Alternatively the second or constant speed step in the operating cycle may be omitted when it is possible to use the full movement for acceleration and deceleration.

More specifically it is an object to provide a cyclic control system for a hoist drive or other power transmission apparatus embodying a stop-go control means and an acceleration-deceleration control means together with independent means for initiating a cycle of operation and means under the control of the driven end of the power transmission for initiating a period of deceleration and subsequently stopping operation of the driven end of the device wherein a unitary member under the control of the driven end of the device may operate both the stop-go control means and the acceleration-deceleration control means in the required sequence. Additionally it is desired to provide such a cyclic control means wherein the independent means for initiating a cycle of operation may be automatically disabled after the cycle has begun and may not again become effective to exercise control until the cycle is terminated.

Another object of the present invention lies in the provision of a novel fluid pressure hoist drive system that employs a "Waterbury" hydraulic variable speed transmission for conveying the operating energy from an electric motor or other suitable and preferably substantially constant speed power source to the hoist or conveyor, the said hoist drive system having fluid pressure operated control means for determining the periods of operation and the speeds of operation of the "Waterbury" motor or "B-end" that drives the hoist or conveyor, said control means being responsive to such factors as the loading and unloading of articles, the closing of conveyor casing doors, etc., in addition to the predetermined setting or adjustment of the output capacity of the transmission pump or "A-end."

When the control means for such a hoist drive system is responsive to the positioning of articles on the hoist, it is important to insure that the hoist is brought to rest with its flights in the same relative position at the end of each operation so that there will be substantially no variation in the rest position of the hoist flights from one cycle to the next. It is an object of the present invention, therefore, to provide means for insuring proper register of the hoist flights at the loading and unloading stations when the hoist is brought to rest at the end of a cycle. This object is accomplished preferably by the provision of valve means under the influence of the hoist motor and acting to automatically correct any deviation from the desired position of rest irrespective of its cause.

Another object also lies in the provision of a valve, preferably of the rotary type, to control the motor for automatically bringing the motor and its driven device, whether it be a hoist or other apparatus, to a position which is determined by the position of one member of the valve and in the provision of a novel power transmission system incorporating a valve of this character.

A further object is to provide means for preventing back travel of the hoist whenever the normal drive system therefor is not in operation and to arrange the apparatus so that the blocking means employed is rendered ineffective automatically whenever the hoist drive is in operation, and conversely it is automatically brought into operation as soon as operation of the hoist drive is discontinued.

A further object is to provide a fluid power transmission for driving a hoist or other load device which is operable in either direction of movement and to incorporate therein means for compensating for the effect of gravity or other influence tending to increase the load in one direction of movement and decrease the load in the other direction of movement.

Further objects and advantages of the present invention will be apparent from the following description, reference being had to the accompanying drawings wherein a preferred form of the present invention is clearly shown.

In the drawings:

Fig. 1 is a diagrammatic view of a fluid pressure hoist drive system embodying one form of the present invention.

Fig. 2 is a side view of the lower end of a hoist constructed according to the present invention.

Fig. 3 is a back view of the lower end of a hoist embodying one form of the present invention.

Referring now to Fig. 1, the numeral 10 indicates a suitable prime mover such as a constant speed electric motor which is coupled to drive a fluid pump 12 forming a source of fluid under pressure. Pump 12 is illustrated as of the well-known "Waterbury" type and so constructed that its displacement may be varied for delivering any desired amount of fluid to a high pressure delivery conduit 14 while an equal quantity of fluid is withdrawn from a low pressure return conduit 16. Conduits 14 and 16 are connected to a valve body 18 forming part of a cyclic control system later to be described and the main power circuit is continued from the valve body 18 through conduits 20 and 22 to a valve 24 formed as part of a fixed displacement hydraulic motor 26 which may be of any suitable construction such as the well-known "Waterbury" type heretofore referred to. The pump 12 and the motor 26 are customarily termed the "A-end" and "B-end" respectively of a hydraulic transmission system. The "B-end" 26 drives a sprocket shaft 28 through the medium of a worm gearing 30. The shaft 28 in turn carries a sprocket 32 forming a part of a hoist or conveyor 34 representing a load device for the power transmission system. The hoist is indicated diagrammatically as comprising a chain 36 running over the sprocket 32 and over an idler sprocket 38 at the top of the hoist, the chain carrying a plurality of equally spaced article carriers 40.

The power transmission system which drives the hoist includes a cyclic control system for operating the hoist automatically in response to the presence or absence of articles at the loading and unloading stations and in response to the operation of a door at the loading station, the control system being arranged to operate the hoist through the distance of one flight automatically with a predetermined acceleration and deceleration at the beginning and end of the cycle, respectively.

The control system includes a blocking or starting and stopping valve 42 comprising piston valve members 44 and 46 slidably arranged within a bore 48 with which the conduits 14 and 16 communicate at opposite sides of the valve member 46. In order to provide for positive control of the acceleration and deceleration of the hoist during the cycle, a pilot control valve 50 is provided for controlling the admission of fluid from a conduit 52 to a stroke regulating cylinder 54, situated in the "A-end" 12. Valve 50 comprises a pair of piston valves 56 and 58 slidable in a bore 60 and has a central passage 62 therethrough, terminating in a hole 64 for conducting fluid from the upper side of the valve member 56 to the lower side of the valve member 58. The valve members 56 and 58 are so spaced that they may serve to alternately connect the conduits 66 and 68 leading to opposite ends of the stroke regulating cylinder 54, either with the pressure supply conduit 52 or with a return conduit 70. Both the valves 42 and 50 are preferably rigidly secured together by means of a main operating member or stem 72 which carries at its lower end a roller 74 acting as a follower for a cam 76. The cam 76 is driven from the sprocket shaft 28 through timing gears 78 and counter-shaft 80, the timing gears being arranged to produce one revolution of the cam 76 for each flight of the hoist 34. The parts 74, 76, 78 and 80 thus comprise a motor operated actuating means for the main operating member 72 for the valves 42 and 50.

An independent fluid pressure operated actuating means for the member 72 is also provided for the purpose of initiating a cycle of operation. For this purpose the member 72 is formed with an enlarged portion 82 between the valves 42 and 50, the lower end of which is formed to provide a valve 84. A lifting piston 86 is slidably mounted within a large bore 88 at its lower end, and a smaller bore 90 at its upper end, and has a bore 92 slidably engaging the enlarged portion 82. The piston 86 is formed with a valve seat at its lower end cooperating with the valve 84, and immediately above the valve seat is provided with a chamber 94 communicating by means of holes 98 with a chamber 96 formed in the valve body.

A conduit 100 admits pressure fluid to the bore 88 beneath the piston 86 from an interlock circuit later to be described. The chamber 94 is in communication with a fluid return circuit through a hole 102 in the member 82, a central bore 104 and a hole 106 leading to the interior of a case 108 (Fig. 3) surrounding the cam 76 and associated mechanism. A shoulder 110 is formed on the piston 86 to limit its upward travel by engagement with a shoulder 112 between the bores 90 and 96.

The member 72 has a normal downward bias caused by the fluid pressure constantly exerted from conduit 52 on the upper end of the enlarged portion 82; so that the follower 74 is urged into engagement with cam 76 at all times except when this bias is overcome by the lift piston 86.

The relative disposition of the mechanism so far described in the valve body 18 is such that with the parts in the position shown with roller 74 engaged in a notch 114 of cam 76, valve 84 closes the opening in the lower wall of the piston 86, valve 42 closes communication between the conduits 14 and 16 and a pair of conduits 116 and 118 formed in the body 18, and valve 50 connects conduit 68 with the supply line 52 and conduit 66 with the return conduit 70.

When fluid is admitted through the conduit 100 from the interlock circuit, the piston 86 lifts the entire assembly carried by the operating member 72 until stop 110 engages stop 112. In this position the roller 74 is raised to a height above the low dwell portions 120 of the cam 76 but just short of clearing a high dwell portion 122 of the cam 76. The valve 42 in this position opens communication between the conduits 14 and 116, and between 16 and 118 respectively, while the valve 50 transposes the connections of conduits 66 and 68 with the supply and return conduits 52 and 70 and the hoist is set in motion with graduated acceleration. Upon rotation of the cam 76 in either direction sufficiently to bring the high dwell portion 122 under the roller 74, the operating member 72 is further raised to a position in which the valve 84 is opened. In moving to this position the valves 42 and 50 do not change the connections made in the previous position. Upon further movement of the cam 76 sufficient to permit roller 74 to drop to one of the low dwell portions 120, the operating member 72 falls sufficiently to again transpose the connections between conduits 66 and 68 and conduits 52 and 70, respectively, at the valve 50 without closing off communication between the conduits 14, 16, 116, and 118 at the valve 42.

Control of the initial raising of the operating member 72 by fluid admitted through the conduit 100 is provided through an interlock circuit arranged to respond to conditions at the hoist in a manner to start the hoist only when three conditions are fulfilled. These conditions are that an article must be in position on the hoist at the loading station, no article must be in position on the hoist at the unloading station, and the loading doors must be closed.

For the purpose of supplying fluid under pressure to the interlock circuit and also to the acceleration-deceleration control circuit, an auxiliary pump 124 is provided at the "A-end" 12 to be constantly driven by the motor 10. Pump 124 has an inlet conduit 126 communicating by conduits 128, 70 and 130 with the usual expansion tank 132. An outlet conduit 134 leads to a relief valve 136 having a relief connection to the conduit 70 and from which a conduit 138 leads to a pilot reverse valve 140. The pilot reverse valve 140 is rigidly connected to a main reverse valve 142 formed in the valve body 18 for respectively transposing communication between the conduits 116 and 118 and the conduits 20 and 22 when it is desired to operate the hoist in a lowering direction. The pilot reverse valve 140 and the main reverse valve 142 are operated by a hand lever 144 which also operates a reverse switch 146 later to be described.

With the parts in the position illustrated in Fig. 1, the valve 142 connects conduits 116 and 118 with the conduits 20 and 22 respectively for operation of the hoist to raise articles from the lower station to the upper station, and pilot reverse valve 140 connects conduit 138 with a conduit 148 leading to a triple interlock valve block 150. With the handle 144 moved to the opposite position, valve 142 transposes the connections of conduits 20 and 22, thus reversing the operation of the motor 26 while valve 140 closes off conduit 148 and connects conduit 138 with a conduit 152 also leading to the triple interlock valve block 150. Triple interlock valve block 150 contains a lower trip valve 154 for selectively connecting either conduit 148 or 152 with a conduit 156. The valve 154 is operated by a lower trip 158 which is adapted to be held in the position illustrated by the presence of an article as indicated at 160 at the lower end of the hoist. In this position conduit 148 is connected with conduit 156, conduit 152 being blocked. When the article is removed from the position illustrated, a spring 162 moves the trip 158 and valve 154 to connect conduit 152 with the conduit 156 and to block off the conduit 148.

The block 150 also contains a solenoid operated upper trip valve 164 for connecting and disconnecting conduit 156 with a conduit 166. Also mounted in the valve block 150 is a door operated interlock valve 168 for connecting or disconnecting conduit 166 with the conduit 100 leading through a check valve 169 to the lift piston 86. The valve 164 is arranged to be closed when a solenoid 170 is deenergized while the valve 168 is arranged to be closed when the bottom hoist doors indicated at 172 are opened. For this purpose a cam 174 is operated by the doors to actuate a lever 176 connected with the valve 168.

Leakage drain conduits 175 and 177 are provided for collecting any leakage along the stems of the valves 154, 164, and 168 for return through a conduit 179 to tank 132.

The solenoid 170 is connected by means of wires 178 with a junction box 180. Current is fed to the solenoid circuit through wires 182 leading from a motor starter 184 to the junction box 180. The solenoid circuit includes the reversing switch 146 and an upper trip limit switch 186, the latter having four operating positions indicated at *a*, *b*, *c*, and *d*.

Switch 186 is actuated by an upper trip lever 188 which is moved from position "*a*" to position "*b*" automatically when an article is present at the upper station of the hoist. The trip lever 188 may be manually moved from position "*b*" to positions "*c*" and "*d*." In position "*a*" the solenoid may be energized only if the reversing switch 146 is in the position illustrated. Likewise, in position "*d*" the solenoid 170 is energized only if the reversing switch 146 has been moved to the opposite position from that illustrated. In positions "*b*" and "*c*" the solenoid 170 is deenergized due to the opening of the circuit at the switch 186.

The motor starter 184 may be of any suitable type and is arranged to connect the line circuit entering through wires 190 with the motor 10 which is connected to the starter 184 through wires 192. Suitable circuit breaker means are provided in the starter box 184 which may be actuated by a switch 194 connected to the starter box 184 by wires 196, switch 194 being actuated concurrently with the selector valve 24.

For the purpose of maintaining the rest position of the hoist invariable regardless of variations of load upon it, a centering valve is provided which is indicated generally at 198. This valve comprises a stationary body 200 having a cylindrical bore 202. A conduit 204 communicates from the high pressure conduit 14 of the main fluid circuit with the bore 202 at a port 206 while a conduit 208 communicates between the return conduit 16 of the main fluid circuit and the bore 202 at a port 210. A conduit 212 communicates with the main circuit line 20 and with the bore 202 at ports 214 and 216 while a conduit 218 communicates between the main fluid circuit conduit 22 and the bore 202 at ports 220 and 222.

Rotatably mounted within the bore 202 is a valve member 224 having a pair of recesses 226 and 228 formed in its outer surface. These recesses are of a length to substantially close off the port 202 from ports 214 and 220 and to substantially close port 210 from ports 216 and 222 in the position illustrated. They are so arranged, however, that upon any movement of the member 224 out of the position illustrated, the port 202 will be connected with either one of ports 214 and 220 and corresponding connections made between port 210 and either port 216 or 222. In practice ports 210, 216, 222 and the recess 226 may be offset axially from the ports 206, 214 and 220 and the recess 228 so that recess 226 will not register with port 202 when the member 224 is rotated 180 degrees. The member 224 is directly connected to the countershaft 80 so that it makes one revolution per cycle of operation. The conduits leading to and from the centering valve 198 may be made small in comparison to the main fluid circuit so that its effect is negligible except when blocking valve 42 is closed.

In order to compensate for the difference in load between hoisting and lowering operations due to the weight of the articles upon the hoist 34, the reverse valve 142 is constructed with a restricted passage 229 connecting the space above piston valve member 231 with the space beneath piston valve member 233. When handle 144 is moved to reverse the operation of motor 26 for lowering operation conduit 116 is then connected to conduit 22 and conduit 118 is connected to conduit 20 through the passage 229. There is thus introduced a small braking effect during lowering operation due to the fluid resistance of the passage 229 so that the load on the "A-end" 12 may be maintained substantially the same as that during hoisting and the timing of the control system will not be disturbed.

In order to provide for emergency operation of the hoist by manual means, a hand operated pump 230 is provided having interchangeable inlet and outlet connections 232 and 236 leading to the selector valve 24. With the selector valve in the position illustrated, the "B-end" 26 is connected to be operated by fluid supplied from the "A-end" 12 through the cyclic control system previously described. When the valve 24 is moved to the right-hand position (Fig. 1), the "B-end" 26 is cut off from the conduits 20 and 22 and connected to conduits 232 and 236 for direct actuation by the hand pump 230. The hoist may then be operated in either direction by manually operating the pump 230 in one direction or the other.

In order to prevent backing down of the hoist when the "A-end" 12 and the hand pump 230 are not being operated, such as might occur due to slow leakage at the "B-end" 26, a mechanical lock for the sprocket shaft 28 is provided. This comprises a ratchet wheel 238 connected to the sprocket shaft 28 in a suitable manner. This is shown in Fig. 1 as connected by a chain drive 240 for convenience in illustrating the hydraulic circuits, although in practice it is preferred to connect the rachet 238 directly to shaft 28 as illustrated in Figs. 2 and 3. The positioning and number of teeth on the ratchet 238 is chosen in relation to the ratio of the timing gears 78 so that one of the teeth will be brought into position at the end of each cycle. Thus, with a five-tooth ratchet as shown in Fig. 1 the ratio of the timing gears 78 may be such that the sprocket shaft 28 makes one and one-fifth revolutions to one revolution of the countershaft 80 that is while the hoist moves through the distance of one flight. Coacting with the ratchet wheel 238 is a detent 242 carried by a lever 244 pivoted at 246. A spring 248 urges the lever 244 clockwise in Fig. 1 to engage the detent 242 with the ratchet 238.

A piston 250 is slidably mounted in a cylinder 252 and operatively related to the upper end of the lever 244 so that when fluid under pressure is maintained in the cylinder 252, the detent 242 may be held out of engagement with the ratchet wheel 238. The piston 250 is preferably a rather loose fit to the cylinder 252 so that fluid will leak out of cylinder 252 and the piston 250 will return to engage detent 242 with the ratchet wheel 238 whenever the supply of fluid under pressure is interrupted. Cylinder 252 is supplied with pressure fluid from the "A-end" 12 through the conduit 204, a conduit 254, a check valve 256 and a conduit 258. Fluid from the hand pump 230 is supplied from either conduit 232 or conduit 236 through the double check valve 234 to a conduit 260 connecting with the conduit 258.

The casings of the "A-end" 12 and "B-end" 26 are connected to the expansion tank in the usual manner through coduits 262, 70 and 130 for the "A-end," and through conduit 264 for the "B-end." Likewise a conduit, not shown, connects the cam case 108 with the expansion tank.

Replenishing of the fluid in the main power circuit may be accomplished in any suitable manner, for example by replenishing valves of well-known construction for admitting fluid from the "A-" or "B-end" case to the low pressure side of the main power circuit. Replenishing of the hand pump circuit is provided by check valves 266 and 268 communicating with the conduit 264 and with the conduits 232 and 236 respectively.

Figs. 2 and 3 illustrate the lower end of a hoist embodying a preferred construction showing the manner of assembling the "B-end" and the cyclic control system to the hoist, similar reference characters designating similar parts illustrated in Fig. 1.

In operation the system being completely filled with suitable motive fluid, such as ordinary lubricating oil, and the motor 10 being in operation, with the parts in the position illustrated in Fig. 1, the hoist will remain stationary due to the presence of an article at the upper end of the hoist. At this time the "A-end" is operating at minimum stroke due to pressure fluid from pump 124 acting on stroke regulator 54 through conduit 68. Since the lever 144 and reverse valves 140 and 142 and switch 146 are set for hoisting operation, the presence of the article at the top of the hoist holds the upper trip lever 188 in position "b" opening the circuit to the solenoid 170 at the upper trip limit switch 186. As soon as the article is removed from the upper end of the hoist, the upper trip lever 188 moves to position "a," closing the circuit to the solenoid 170 thus opening the solenoid valve 164 and permitting fluid under pressure to pass from the pump 124 through conduits 134, 138, valve 140, conduit 148, valve 154, conduit 156, valve 164, conduit 166, valve 168, and conduit 100 to the lower side of the lift piston 86. The main operating member 72 of the cyclic control system is thereby raised to a position in which the roller 74 is just short of clearing the high dwell portion 122 on cam 76. By this movement valve 42 opens the main power circuit connecting the conduit 14 with conduit 20, and connecting conduit 16 with conduit 22. Also valve 50 connects the conduit 66 leading to the upper end of the stroke regulating cylinder 54 to the pressure side of the pump 124 through conduits 134, 52, 62, and 64. Likewise, the lower end of the stroke regulating cylinder 54 is connected to the tank 132 through conduits 68, 70 and 130.

The stroke regulating mechanism will thereupon be operated to increase the stroke of the "A-end" 12 from the predetermined minimum determined by the upper stop screw 270 in cylinder 54 to the maximum stroke determined by the lower stop screw 272 in cylinder 54, the rate of movement being determined by the capacity of the pump 124 and the lines leading to and from the stroke regulating cylinder 54. Fluid will thereupon be pumped by the "A-end" through conduit 14, valve 42, conduit 116, valve 142, conduit 20 and valve 24 to the "B-end" 26; fluid returning from the "B-end" through valve 24, conduit 22, valve 142, conduit 118, valve 42 and conduit 16 to the "A-end" 12. The "B-end" will thereon rotate at a rate corresponding to the rate of delivery of fluid from the "A-end" 12 and the hoist will move upwardly with a predetermined rate of acceleration. As soon as the stroke regulating mechanism has moved the "A-end" into its full stroke position, the speed of the hoist will continue at a constant rate.

Initial movement of the hoist permits trip 158 to move upwardly and close valve 154 as soon as the article leaves the position illustrated but the fluid under piston 86 is trapped there by check valve 169, thus holding follower 74 above the low dwell portion 120 of cam 76 but not high enough to clear the high dwell portion 122.

When the high dwell portion 122 of cam 76 comes under the roller 74, the main operating member 72 is raised an amount sufficient to open the valve 84, thus opening communication between the chamber 94 and the bottom side of piston 86 and venting the pressure fluid trapped below said piston. The fluid pressure constantly exerted upon the top annular surface of the piston 86 by fluid in the chamber 90 is thus able to force the piston 86 downwardly into its original position while the main operating member 72 remains at its highest point of lift. The oil displaced from underneath the piston 86 passes upwardly through the valve 84, chamber 94 and passages 98 to fill the chamber 96. Normally, the space beneath the piston 86 is not subjected to pressure from the interlock circuit at this time since the first movement of the hoist removes the article 60 from the lower trip 158, thus closing the valve 154. Should, however, the interlock circuit be again opened before the member 72 is lifted by the high dwell portion 122 of cam 76, the piston 86 will return in the same manner due to the opening of the valve 84, and the fluid admitted through the pipe 100 will pass to the expansion tank through holes 102, 104, and 106 and cam case 108.

Upon further travel of the hoist the roller 74 drops to the low dwell portion 120 and by this movement transposes the conduits 66 and 68 with relation to the conduits 52 and 70. Fluid under pressure is thereby admitted to the lower end of the stroke regulating cylinder 54 and exhausted from the upper end thereof, thus bringing the "A-end" to minimum stroke at a predetermined rate. The "B-end" is thereby decelerated so that by the time roller 74 falls into the notch 114 of cam 76, the hoist is traveling at its minimum speed and the closing of valve 42 will not cause undesirable shock in the system.

It will be seen that the member 72 carries with it the movable member of valve 42 which constitutes a member for controlling the starting and stopping of the hoist or driven element and also the movable member of valve 50 which constitutes a second member for controlling the acceleration and deceleration of the hoist or driven element. There is one position of the member 72, when follower 74 is in notch 114, when valve 42 is in stopping position and valve 50 is in decelerating position. In a second position with follower 74 resting on the low dwell position 120, valve 42 is opened or in running position while valve 50 is in decelerating position. In a third position with follower 74 lifted above low dwell portion 120 by piston 86 but not high enough to clear high dwell portion 122, the valve 42 is in another running position while the valve 50 is in accelerating position. In this position valve 84 is held closed. In a fourth position when follower 74 is resting on the high dwell portion 122, the connections made by valves 42 and 50 are the same as in the third position but valve 84 is opened. The sequence of operations is normally from the first position directly to the third position, from there to the fourth, from the fourth directly to the second position and from there to the first. The piston 86 forms a fluid pressure operated means for moving the entire control member 72 from stopping position to starting position while the cam 76 forms a means operated by the motor 26 for holding the member 76 out of stopping position until after a predetermined amount of movement of the motor 26; namely, enough to rotate the cam 76 one revolution. It is also to be noted that the piston 86 is prevented, once it has lifted member 72, from again lifting it until the member has returned to stopping position. This feature insures that each cycle will be completed in its normal manner even though the interlock circuit be conditioned for starting another cycle before the first cycle is completed.

As soon as the hoist reaches a point near the end of its cycle, the centering valve 198 comes into operation and connects conduit 14 to conduit 20 around the valves 42 and 142 through conduits 204, ports 206 and 214, and conduit 212. Likewise, conduit 16 is connected to conduit 22 around the valves 42 and 142 through conduit 208, ports 210 and 222, and conduit 218. Since the conduits leading to and from the centering valve are small in comparison to the other conduits in the main power circuit, the effect of the centering valve at this time is negligible. By the time the roller 74 drops into the notch 114, however, the centering valve comes to the position shown, cutting off ports 206 and 210 from communication with any of their associated ports. If the inertia of the hoist and its load is so great as to cause overtravel, the "B-end" thereupon is connected to the "A-end" for reverse rotation by the centering valve 198. The circuit is, under this condition, conduit 14, conduit 204, port 206, port 220, conduit 218 to conduit 22 and from conduit 16 through conduit 208, port 210, port 216 and conduit 212 to conduit 20. The hoist is thereupon reversed and brought back to its precise position of rest wherein the centering valve closes off the ports 202 and 222.

In practice, a small amount of overlap may be provided in the recesses 226 and 228 so that in the rest position a very slight by-passing of fluid from the high to the low side of the "A-end" is possible, thus preventing the necessity of blowing off excess fluid pumped by the "A-end" at minimum stroke through the relief valves which are ordinarily provided. If the gravity load of articles on the chain is great enough to overhaul the motor 26 and tend to drive it backwards, the valve comes to rest with a slightly greater opening between ports 206—214 and ports 210—222 than the opening between 206—220 and ports 210—216. The amount of by-pass opening from the high to the low side of the main circuit through the centering valve is thus reduced until just sufficient pressure is maintained in conduit 20 to exactly balance the tendency of the hoist to back-travel and to replace any fluid lost by leakage at the motor 26.

When it is desired to lower articles from the upper station to the lower station, the lever 144 is operated to the opposite position, thus reversing valves 140 and 142, and switch 146. Under these conditions the relation of the conduits 14 and 16 to the conduits 20 and 22 is transposed so that the "B-end" 26 operates in the reverse direction. Likewise the conduit 138 is now connected to conduit 152 by the valve 140 so that the operation of the lower trip valve 154 is reversed under these conditions.

In order to start the hoist it is then necessary that any articles such as 160 at the lower end of the hoist be removed, permitting pressure fluid to pass from valve 140 through conduit 152, and valve 154 to conduit 156. Likewise, it is necessary that the upper trip lever 188 be manually moved from position "c" to position "d" due to the reversal of switch 146. Upon this movement of lever 188 the hoist will again start and go through a cycle of operation identical to that previously described except for the direction of travel of the hoist. During lowering movement fluid returning from the "B-end" 26 must pass through the restricted passage 229, thus compensating for the decreased load due to gravity.

If it is desired to operate the hoist manually rather than by the power driven "A-end," the selector valve 24 may be moved to the right, thus connecting the "B-end" with the conduits 232 and 236 instead of to the conduits 20 and 22. Operation of the hoist under these conditions is entirely controlled by the rate and direction of the hand pump 230.

Whenever the selector valve 24 is in position for hand operation of the hoist by the pump 230, the switch 194 acting through the motor starter 184 prevents the motor 10 from being started. Thus, should motor 10 be stopped by interruption in the power supply and the hoist be operated by the hand pump 230, the resumption of power supply can not damage the system by permitting the motor 10 to be started while the hoist is in operation under manual power and in the middle of a flight.

Whenever neither the "A-end" 12 nor the hand pump 230 is in operation, the hoist is locked against back travel by the detent 242 engaging ratchet wheel 238. As soon as both pumps have stopped, leakage of fluid from the cylinder 252 permits the arm 244 to move clockwise in Fig. 1 under the influence of spring 248, thus bringing the detent into engagement with the ratchet wheel 238. As soon as either the hand pump 230 or the "A-end" 12 is placed in operation, however, pressure fluid supplied either from conduit 260 or from conduit 254 through check valve 256 and conduit 258 forces the piston 250 out of the cylinder 252, thus removing the detent 242 from the ratchet wheel 238.

Thus, it will be seen that the present invention provides a hydraulic hoist drive system and cyclic control therefor which insures automatic operation of the hoist in response to loading and unloading of articles with a predetermined cycle of operation and which precisely controls the acceleration and deceleration of the hoist as well as its position at rest through the use of a simple and reliable mechanism.

While the form of embodiment of the invention as herein disclosed, constitutes a preferred form, it is to be understood that other forms might be adopted, all coming within the scope of the claims which follow.

What is claimed is as follows:

1. In a fluid pressure power transmission system the combination of a source of fluid under pressure, a fluid pressure motor, a driven device operated by the motor and means for maintaining the driven device in a predetermined position including a valve having a movable member permanently connected to the driven device and operable in accordance with displacement of the driven device in either direction from the predetermined position to connect the motor to the source of pressure fluid for actuation of the driven device in the direction opposite to that of the displacement.

2. In a fluid power transmission system the combination of a fluid pressure motor, a source of pressure fluid, a valve for controlling operation of the motor comprising two valve members adapted for rotation of one relative to the other, a port in one member for the admission of pressure fluid to the valve, a pair of ports spaced from the first port and from each other for the egress of fluid from the valve to cause operation of the motor in respectively opposite directions, means on one valve member for connecting the first port selectively with either of the two other ports and effective in one position to substantially close off the first port from either of the other ports, and means for rotating said one of the valve members in fixed ratio to movement of the motor.

3. In a fluid power transmission system the combination with a source of fluid under pressure, a fluid motor, a fluid circuit connecting the motor and the source of pressure fluid, of a cyclical control comprising a valve in the circuit for starting and stopping the motor, fluid pressure operated means for moving the valve to starting position, means operated by the motor for holding the valve out of stopping position until after a predetermined amount of movement of the motor, said fluid pressure operated means being rendered ineffective to move or hold the valve after the valve is held out of stopping position by the motor operated means and until the valve has returned to stopping position.

4. In a fluid power transmission system the combination with a source of fluid under pressure, a fluid motor, a fluid circuit connecting the motor and the source of pressure fluid, of a cyclical control comprising a valve in the circuit for starting and stopping the motor, fluid pressure operated means for moving the valve to starting position, means operated by the motor for holding the valve out of stopping position until after a predetermined amount of movement of the motor, said fluid pressure operated means being rendered ineffective to move or hold the valve after the valve is held out of stopping position by the motor operated means and until the valve has returned to stopping position and additional fluid pressure means for returning the valve to stopping position after said predetermined amount of movement of the motor.

5. In a fluid power transmission system the combination with a source of fluid under pressure, a fluid motor, a fluid circuit connecting the motor and the source of pressure fluid, of a cyclical control comprising a valve in the circuit for starting and stopping the motor, fluid pressure operated means, including a piston, for moving the valve to starting position, means operated by the motor for holding the valve out of stopping position until after a predetermined amount of movement of the motor, and means for returning said piston independently of the valve while the valve is held out of stopping position by the motor operated means.

6. In a variable speed power transmission system the combination of a driving element, a driven element, a substantially constant speed prime mover for operating the driving element, a load device operated by the driven element, means for driving the driven element from the driving element at variable speeds, a cyclical control system for said means said system including a member for controlling the starting and stopping of the driven element and movable from a stopping position into a plurality of running positions, a second member for controlling the acceleration and deceleration of the driven element and movable with the first member from a plurality of decelerating positions corresponding to the stopping position and one of the running positions of the first member to an accelerating position corresponding to another running position of the first member, means for starting a cycle of operation by moving said members together into a running position of the first member and an accelerating position of the second member and means operated from the driven element for controlling movement of said members together first into another running position of the first member and a decelerating position of the second member and later into a stopping position of the first member and a decelerating position of the second member.

7. In a variable speed power transmission system the combination of a driving element, a driven element, a substantially constant speed prime mover for operating the driving element, a load device operated by the driven element, means for driving the driven element from the driving element at variable speeds, a cyclical control system for said means said system including a member for controlling the starting and stopping of the driven element and movable between stopping and running positions, a second member for controlling the acceleration and deceleration of the driven element and movable between accelerating and decelerating positions, operating means for said members including a unitary member operable at the beginning of a cycle to place said members in running and accelerating positions respectively and operable before the end of a cycle to place said members in running and decelerating positions respectively and operable at the end of a cycle to place the first member in stopping position, means for moving the operating means at the beginning of a cycle and additional means actuated from the driven element for controlling the movement of the operating means during and at the end of a cycle.

8. In a variable speed power transmission system the combination of a driving element, a driven element, a substantially constant speed prime mover for operating the driving element, a load device operated by the driven element, means for driving the driven element from the driving element at variable speeds and in opposite directions, a cyclical control system for said means said system including a member for controlling the starting and stopping of the driven element and movable between stopping and running positions, a second member for controlling the acceleration and deceleration of the driven element and movable between accelerating and decelerating positions, operating means for said members including a unitary member operable at the beginning of a cycle to place said members in running and accelerating positions respectively and operable before the end of a cycle to place said members in running and decelerating positions respectively and operable at the end of a cycle to place the first member in stopping position, means for moving the operating means at the beginning of a cycle and additional means actuated from the driven element for controlling the movement of the operating means during and at the end of a cycle, said additional means being constructed to control the operating means in the same manner for either direction of movement of the driven element.

9. In a fluid pressure power transmission system the combination of a fluid pressure motor, a pump for supplying fluid to the motor, control means for starting and stopping the motor, fluid pressure means for operating the control means to start the motor, motor operated means for controlling movement of the control means to stop the motor, and means for disabling the fluid pressure means after the motor has started, said last named means operating to restore the fluid pressure means to operative condition at the end of a cycle of operation.

10. In a fluid pressure hoist drive system the combination of a rotary fluid motor adapted to drive the hoist, a source of fluid under pressure for driving the motor, cyclic control means for controlling the operation of the motor to drive the hoist through a predetermined distance, and a unitary rotary centering valve driven with the motor for bringing the hoist to rest in a predetermined position at the end of a cycle irrespective of variations in loading of the hoist.

11. In a fluid pressure hoist drive system the combination of a fluid motor adapted to drive the hoist, a power driven pump for delivering fluid under pressure to drive the motor, cyclic control means for controlling the delivery of fluid from the pump to the motor to drive the hoist through a predetermined cycle of operation, a manually operated pump for delivering fluid under pressure to drive the motor upon failure of the power driven pump, and a selector valve for connecting the motor either to the power driven pump and the cyclic control means or directly to the manually operated pump alone.

12. In a fluid pressure hoist drive system the combination of a fluid motor adapted to drive the hoist, a source of fluid under pressure for driving the motor, an automatically operating cyclic control system for controlling the operation of said hoist in either direction, a valve for reversing the connection of the motor to said source and means effective during lowering operation to impose an additional load on the drive system, whereby the operation of the control system will remain uniform for lowering operation.

13. In a fluid pressure hoist drive system the combination of a fluid motor adapted to drive the hoist, a source of fluid under pressure for driving the motor, an automatically operating cyclic control system for controlling the operation of said hoist in either direction, a valve for reversing the connection of the motor to said source and means including a restricted fluid passage effective during lowering operation to impose an additional load on the system, whereby the operation of the control system will remain uniform for lowering operation.

14. In a fluid pressure hoist drive system the combination of a fluid motor adapted to drive the hoist, a source of fluid under pressure for driving the motor, a valve for reversing the connection of the motor to said source and means including a restricted passage through the valve effective during lowering operation to impose an additional load on the system.

15. In a fluid power transmission system the combination with a source of fluid under pressure, a fluid motor, a fluid circuit connecting the motor and the source of pressure fluid, of control means for the system including a device for controlling the operation of the motor, operating means driven by the motor for mechanically moving said device in one direction and fluid pressure means for moving said device in the opposite direction to stop the motor when permitted by the operating means.

16. In a fluid power transmission system the combination with a source of fluid under pressure, a fluid motor, a fluid circuit connecting the motor and the source of pressure fluid, of control means for the system including a device for controlling the operation of the motor, operating means including a cam driven by the motor for mechanically moving said device in one direction and fluid pressure means for moving said device in the opposite direction when permitted by the operating means.

17. In a variable speed power transmission system the combination of a driving element, a driven element, a substantially constant speed prime mover for operating the driving element, a load device operated by the driven element, means for driving the driven element from the driving element at variable speeds, a cyclical control system for said means, said system including means for controlling the speed of the driven element after starting thereof to continue the driven element in operation for a predetermined amount of movement and for thereupon stopping the driven element, means for starting the driven element, means subject to control independently of the operation of the driven element for initiating operation of the starting means, and means for preventing repeated operation of the starting means by the last mentioned means until the driven element has been stopped.

18. In a fluid pressure power transmission system the combination of a source of fluid under pressure, a rotary fluid pressure motor, a driven device operated by the motor and means for maintaining the driven device in a predetermined position including a single unitary rotary valve having a rotatable member permanently connected to the driven device operable in accordance with displacement of the driven device in either direction from the predetermined position to connect the motor to the source of pressure fluid for actuation of the driven device in the direction opposite to that of the displacement.

19. In a fluid power transmission system the combination with a source of fluid under pressure, a fluid motor, a fluid circuit connecting the motor and the source of pressure fluid, of a cyclic control comprising a valve in the circuit for starting and stopping the motor, fluid pressure operated means, including a piston, for moving the valve to starting position, means operated by the motor for holding the valve out of stopping position until after a predetermined amount of movement of the motor, and means for returning said piston independently of the valve while the valve is held out of stopping position by the motor operated means, said piston being ineffective to move said valve to starting position until the valve has returned to stopping position.

20. In a fluid power transmission system the combination with a source of fluid under pressure, a fluid motor, a fluid circuit connecting the motor and the source of pressure fluid, of control means for the system including a device for controlling the operation of the motor, operating means driven by the motor for mechanically moving said device in one direction and fluid pressure means for moving said device in the opposite direction when permitted by the operating means, and additional means for at times moving said device in said one direction independently of said operating means.

21. In a fluid power transmission system the combination with a source of fluid under pressure, a fluid motor, a fluid circuit connecting the motor and the source of pressure fluid, of control means for the system including a device for controlling the operation of the motor, operating means including a cam driven by the motor for mechanically moving said device in one direction and fluid pressure means for moving said device in the opposite direction when permitted by the operating means, and additional means for at times moving said device in said one direction independently of said operating means.

22. In a fluid pressure hoist drive system the combination of a fluid motor adapted to drive the hoist, a power driven pump for delivering fluid under pressure to drive the motor, cyclic control means for controlling the delivery of fluid from the pump to the motor to drive the hoist through a predetermined cycle of operation, a manually operated pump for delivering fluid under pressure to drive the motor upon failure of the power driven pump, a manually operable selector valve for connecting the motor either to the power driven pump or to the manually operated pump, and means controlled by the position of said selector valve for preventing the operation of the power driven pump when the motor is connected to the manually operated pump.

23. A conveyor system for transferring articles from a loading station to an unloading station at high speed with complete safety comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive both to the loading of an article on the conveyor at the loading station and the unloading of an article from the conveyor at the unloading station to automatically start the driving means, stopping means responsive to travel of the conveyor through the distance between adjacent flights to automatically stop the driving means independently of the starting means, whereby when the conveyor is once filled with articles between the stations, delivery is made automatically by a single advancing movement of the conveyor and directly responsive to the loading and unloading of articles on and off the conveyor, and additional control means rendered effective when the conveyor is stopped out of register for moving the conveyor into position with a flight in accurate register at each station.

24. A conveyor system for transferring articles from a loading station to an unloading station at high speed with complete safety comprising in combination an endless band conveyor having a plurality of flights secured thereto and spaced so as to carry a plurality of articles in spaced relation along one portion of the band lying between the stations, driving means connected to operate the conveyor band, and a control system for the driving means including starting means responsive both to the loading of an article on the conveyor at the loading station and the unloading of an article from the conveyor at the unloading station to automatically start the driving means, stopping means responsive to travel of the conveyor through the distance between adjacent flights to automatically stop the driving means independently of the starting means, whereby when the conveyor is once filled with articles between the stations, delivery is made automatically by a single advancing movement of the conveyor and directly responsive to the loading and unloading of articles on and off the conveyor, and additional control means rendered effective when the conveyor is stopped out of register for moving the conveyor either forwardly or reversely into position with a flight in accurate register at each station.

EDWIN L. ROSE.
RALPH L. TWEEDALE.
WILLIAM THOMAS.
EARL M. FRANKLAND.